Dec. 3, 1957  R. MICHAUX  2,815,276
OPTICAL PYROMETERS FOR MEASURING THE TEMPERATURE OF THE
METAL BATH DURING REFINING IN THE CONVERTER
Filed July 20, 1955  2 Sheets-Sheet 1

INVENTOR:
Raymond MICHAUX
BY A. John Michel
ATTORNEY

United States Patent Office 2,815,276
Patented Dec. 3, 1957

2,815,276

OPTICAL PYROMETERS FOR MEASURING THE TEMPERATURE OF THE METAL BATH DURING REFINING IN THE CONVERTER

Raymond Michaux, Saint-Germain-en-Laye, France, assignor to Institut de Recherches de la Siderurgie, Saint-Germain-en-Laye, France, a French professional institution Application July 20, 1955, Serial No. 523,328

Claims priority, application France July 28, 1954

4 Claims. (Cl. 75—60)

My invention relates to a method of and means for the utilization of optical pyrometers for measuring the temperature of the metal bath during refining in the converter.

During refining of crude iron in the basic Bessemer or a Bessemer converter, it is of the utmost interest to the metallurgist to know the evolution of the temperature of the metal bath.

For this purpose, it has been proposed to set up optical pyrometers or photometers to sight the metal bath in the bottom of the converter through one or a plurality of blast nozzles.

Now, such a process utilized without special precautions presents serious disadvantages. Indeed the gas necessary for the refining of the crude iron circulates through the sighting nozzle or nozzles. This gas, which may be air or air supplemented by pure oxygen, reacts on the metal: this is precisely the object of the basic Bessemer or Bessemer process. In that manner, the optical pyrometer of necessity sights one part of the metal at full chemical activity and, as it measures the brilliance of the sighted surface, it gives an indication with respect to the reaction temperature existing at the sighted point. This temperature differs considerably from the temperature in the remainder of the bath, which alone is what the metallurgist is interested in. Moreover, the chemical reaction being extremely violent, there follow sudden variations in brilliance at the points of impact and, if a pyrometer which is sensitive and has rapid response is utilized, this will give extremely distorted indications which are difficult to interpret. These distorted indications are such that, in practice, a pyrometer with rapid response can be utilized only by modifying its period of response and its damping, and this has the effect of removing its main qualities.

The main object of the invention is a method to obviate or mitigate these disadvantages and to obtain useful indications by means of an optical pyrometer with rapid response sighting the bottom of a converter.

Another object of the invention is to provide a method such that chemical reactions in a converter are eliminated at the point sighted by an optical pyrometer.

A further object of the invention is to provide means to mount and secure easily an optical pyrometer on the bottom plate of the wind-box of a converter.

Other objects and advantages of the invention will be apparent during the course of the following description.

In the accompanying drawing forming a part of this application and in which like numerals are employed to designate like parts throughout the same, Fig. 1 shows diagrammatically a pyrometer provided with means according to the invention and mounted on the bottom of a converter;

Figure 1:
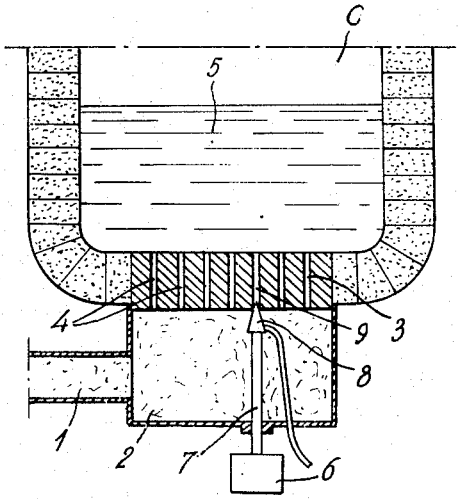

Referring now to Fig. 1, the pipe 1 for admission of blast air into the blast box 2 of the converter C can be seen. The bottom proper 3 is pierced by blast nozzles 4 through which passes the blast air prior to reaching the metal bath 5. The optical pyrometer 6 mounted on the bottom 3 is furnished with a sighting tube 7 which is prolonged by a conical element 8 which penetrates a nozzle 9 which may be chosen arbitrarily for measuring purposes.

Figure 2:
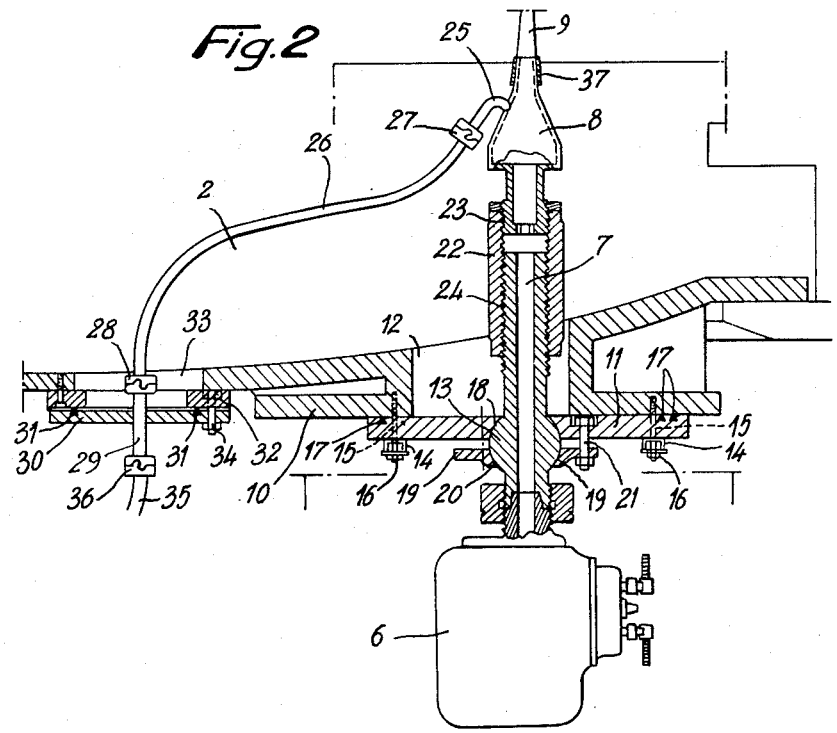
Fig. 2 represents, on a larger scale, a vertical section of the means according to the invention mounted on the base plate of the blast box of the converter.
Figure 3:
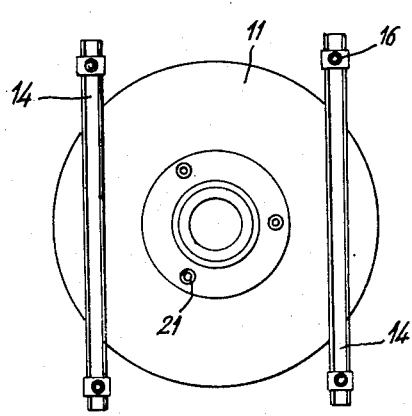
Fig. 3 is a view from below of the mounting elements shown in Fig. 2.

Details of the mounting are shown in more detail in Figs. 2 and 3. As can be seen, the pyrometer is fixed on the base plate 10 of the blast box of the converter by a regulable arrangement comprising essentially, on the one hand, a plate 11 which can be displaced relative to an opening 12 provided in the base plate and, on the other hand, a ball 13 unitary with the sighting tube 7. In that manner, by means of two adjustments, it is easy to regulate the position of the pyrometer so that its optical axis coincides with the axis of the nozzle 9.

The first adjustment consists in displacing the plate 11 to bring it into suitable position. When this position is obtained, the plate 11 is maintained tightly against the base plate 10 by two U-shaped shackles 14, 14 pierced at their ends to permit passage of gudgeons 15, 15 secured to the base plate 10, locking being effected by nuts 16, 16 screwed on to the gudgeons 15, 15.

It should be noted that the plate 11 is provided with surface jointing portions 17 which ensure the necessary fluid-tightness.

The second adjustment consists in suitably orientating the pyrometer, which can be done easily thanks to the ball 13 which can be orientated in a seating 18 provided therefor in the plate 11. The assembly is clamped or locked in the desired position by means of a counterplate 19 provided with a seating 20 which corresponds in shape to the ball 13, the locking being obtained by three bolts 21 disposed at 120° relative to one another.

Height adjustment of the foregoing is obtained by means of the sleeve 22 with two contrary screw threads 23 and 24 which, on rotation draws the thread tube 7 downwards and the conical element 8 upwards.

A branch pipe 25, connected to flexible hose 26 by joint 27, discharges into the conical element 8. At the other end of this hose there is another joint 28 which serves to unite the flexible hose 26 with a tube 29. This latter is welded on to a plate 30 provided with surface jointing portions 31 and locked against a counterplate 32 secured to the base plate 10 which has been pierced to provide a through-passage 33 by means of three bolts 34 disposed mutually at 120° to one another. Finally, the tube 29 is jointed to an external, flexible hose by means of a union 36. The neutral gas, for example nitrogen, arrives by way of the hose 35 at a pressure sufficient, on the one hand, to prevent the entry of blast air into the nozzle 9, which might accidentally occur at joints 28 and 27, and, on the other hand, to prevent the metal from falling on to the pyrometer.

It should be noted that the conical element 8 carries at its end a neoprene jointing portion 37 which ensures fluid-tightness at the entrance to the nozzle 9. Thus, this nozzle is thoroughly isolated from the other nozzles, and the surface of the metal bath sighted by the pyrometer 6 is not the locus of chemical reactions.

Figure 4:
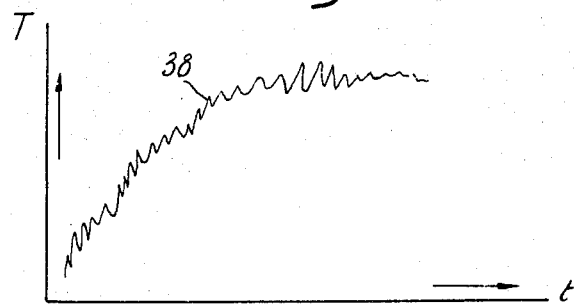
Fig. 4 is a curve obtained with an optical pyrometer sighting through the bottom of the converter.
Figure 5:
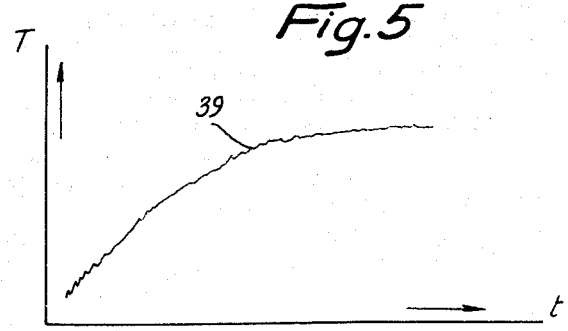
Fig. 5 is a curve obtained with the same pyrometer on utilizing the means according to the invention.

The advantages of the above-described arrangement can be appreciated on consideration of Figs. 4 and 5. In these views the two curves 38 and 39 represent the temperature T as a function of time t, the curve 38 having been obtained with a pyrometer of the two-colour type, the blast air passing through the sighting nozzle, while the curve 39 was obtained with the same pyrometer mounted in position, this time by the means according to the invention.

The curve 39 gives values closer to the mean temperature of the metal bath than those which can be deducted from a mean curve constructed on the basis of the curve 38. Indeed, the reaction temperature at the sighted point is eliminated. Experience shows, moreover, that the nozzles adjacent the sighting nozzle, nozzles in which the refining air circulates, have no influence on the zone sighted by the pyrometer. The oxygen is fixed immediately in the bath fronting the refining nozzles, which explains, moreover, the agitated behaviour of the curve 38.

In the case where the sighting nozzle is partially obstructed at the passage of the inert gas, oxygen can be passed through this nozzle momentarily to clear same.

It is to be understood that the form of the invention herewith shown and described is to be taken as a preferred example of the same and that various changes in the shape, size and arrangement of parts may be resorted to without departing from the spirit of the invention or the scope of the subjoined claims.

What I claim is:

1. A method of measuring the metal bath temperature during the refining process in a converter, comprising the steps of aligning an optical pyrometer with a tuyere hole of the converter, fluid-tightly isolating said tuyere hole from blast air directed into the converter so that no air passes therethrough, directing a chemically inert gas blast into said tuyere hole at a pressure sufficient to prevent blast air from reaching the hole and to prevent the metal bath from falling through the hole onto the pyrometer, and sighting the metal bath through said hole.

2. In a converter having a wind box with a bottom plate, a plurality of tuyere holes above the wind box, and an optical pyrometer with a sighting tube mounted in the bottom plate in alignment with one of said tuyere holes: means for fluid-tightly connecting the sighting tube with said one tuyere hole to isolate the same from an air blast directed from the wind box through the tuyere holes, conduit means communicating with the fluid-tight connecting means, and means for supplying a chemically inert gas under pressure through said conduit means and said fluid-tight connecting means into said one tuyere hole.

3. The converter of claim 2, wherein said fluid-tight connecting means comprises a conical member mounted on the sighting tube and engaging the one tuyere hole, and sealing means arranged at the point of engagement of the conical member with the tuyere hole.

4. The converter of claim 2, wherein said conduit means comprises a hose connected with one end to the fluid-tight connecting means and mounted with its other end in said bottom plate for attachment to the inert gas supply means.

References Cited in the file of this patent

UNITED STATES PATENTS

| | | |
|---|---|---|
| 1,161,995 | Styll | Nov. 30, 1915 |
| 1,318,516 | Wallis et al. | Oct. 14, 1919 |
| 2,020,019 | Collins et al. | Nov. 5, 1935 |
| 2,215,576 | Bucknam et al. | Sept. 24, 1940 |
| 2,232,594 | Dike | Feb. 18, 1941 |
| 2,305,442 | Percy | Dec. 15, 1942 |